United States Patent
Tang et al.

(10) Patent No.: US 10,282,968 B2
(45) Date of Patent: May 7, 2019

(54) INTELLIGENT MONITORING METHOD AND APPARATUS

(71) Applicant: Beijing Baidu Science and Technology Co., Ltd., Beijing (CN)

(72) Inventors: Hu Tang, Beijing (CN); Xiaoyun Yan, Beijing (CN); Jianchao Cao, Beijing (CN); Yiming Luo, Beijing (CN); Lifei Zhang, Beijing (CN); Binghua Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/889,984

(22) Filed: Feb. 6, 2018

(65) Prior Publication Data

US 2018/0324504 A1 Nov. 8, 2018

(30) Foreign Application Priority Data

May 8, 2017 (CN) .......................... 2017 1 0315884

(51) Int. Cl.
*G08B 21/18* (2006.01)
*H04Q 9/00* (2006.01)

(52) U.S. Cl.
CPC ........... *G08B 21/182* (2013.01); *G08B 21/18* (2013.01); *G08B 21/185* (2013.01); *G08B 21/187* (2013.01); *H04Q 9/00* (2013.01)

(58) Field of Classification Search
CPC .... G08B 21/18; G08B 21/182; G08B 21/185; G08B 21/187; G05B 13/00; G05B 13/02; G05B 15/00; G05B 15/02; G05B 23/00; G05B 23/02
See application file for complete search history.

(56) References Cited

U.S. PATENT DOCUMENTS 9,923,377 B2 * 3/2018 Warren .................. H02H 3/335
2013/0317659 A1 * 11/2013 Thomas ............ H04W 52/0216
700/286

(Continued)

FOREIGN PATENT DOCUMENTS

CN 103019135 A 4/2013

*Primary Examiner* — Van T Trieu
(74) *Attorney, Agent, or Firm* — Seed IP Law Group LLP (57) ABSTRACT

The present disclosure discloses an intelligent monitoring method and apparatus. One specific implementation of the method comprises: determining, based on a plurality of parameter values of a warning associated parameter of a to-be-monitored apparatus within a preset period, a time dependent characteristic that parameter values of the warning associated parameter; and determining a target period, based on the parameter values of the warning associated parameter of the to-be-monitored apparatus at a current time and the time dependent characteristic of the parameter values of the warning associated parameter, and determining whether to generate a warning information based on a period interval encompassing the target period. The warning of possible faults in the operation of industrial equipment is implemented, without a manual monitoring of the operation of the industrial equipment is not required and a complete automated operation of the industrial equipment is implemented.

12 Claims, 8 Drawing Sheets

(56) References Cited

U.S. PATENT DOCUMENTS

| | | | | |
|---|---|---|---|---|
| 2014/0005809 A1* | 1/2014 | Frei | ................... | H04L 29/1249 |
| | | | | 700/90 |
| 2014/0354439 A1* | 12/2014 | Nguyen | ............... | G08B 21/182 |
| | | | | 340/660 |
| 2017/0317580 A1* | 11/2017 | Lyles | ..................... | H02M 3/04 |

* cited by examiner

INTELLIGENT MONITORING METHOD AND APPARATUS

CROSS-REFERENCE TO RELATED APPLICATION

This application claims the priority of Chinese Patent Application No. 201710315884.3, entitled "Intelligent Monitoring Method and Apparatus," filed on May 8, 2017, the content of which is incorporated herein by reference in its entirety.

TECHNICAL FIELD

The present disclosure relates to the field of computers, particularly to the field of operation and maintenance technologies, and more particularly to an intelligent monitoring method and apparatus.

BACKGROUND

Computer technology is widely used in the control of the industrial equipment to improve the automation level of the industrial equipment. However, in key stages, such as the maintenance of the industrial equipment, maintenance is still implemented through manual periodic inspection of the operation of the industrial equipment, thus a complete automated operation of the industrial equipment cannot be implemented.

SUMMARY

The present disclosure provides an intelligent monitoring method and apparatus, to solve the technical problems mentioned in the above background section.

According to a first aspect, the present disclosure provides an intelligent monitoring method, the method comprising: determining, based on a plurality of parameter values of a warning associated parameter of a to-be-monitored apparatus within a preset period, a time dependent characteristic of the warning associated parameter; and determining a target period, based on the parameter values of the warning associated parameter of the to-be-monitored apparatus at a current time and the time dependent characteristic of the warning associated parameter, and determining whether to generate warning information based on a period interval encompassing the target period, the target period being a period between the current time and the parameter values of the warning associated parameter being greater than a threshold corresponding to the warning associated parameter.

According to a second aspect, the present disclosure provides an intelligent monitoring apparatus, the apparatus comprising: a determination unit, configured to determine, based on a plurality of parameter values of a warning associated parameter of a to-be-monitored apparatus within a preset period, a time dependent characteristic of the warning associated parameter; and a warning unit, configured to determine a target period, based on the parameter values of the warning associated parameter of the to-be-monitored apparatus at a current time and the time dependent characteristic of the warning associated parameter, and determining whether to generate warning information based on a period interval encompassing the target period, the target period being a period between the current time and the parameter values of the warning associated parameter being greater than a threshold corresponding to the warning associated parameter.

By determining a time dependent characteristic of the warning associated parameter, based on a plurality of parameter values of a warning associated parameter of a to-be-monitored apparatus within a preset period; and determining a target period, based on the parameter values of the warning associated parameter of the to-be-monitored apparatus at a current time and the time dependent characteristic of the warning associated parameter, and determining whether to generate warning information based on a period interval encompassing the target period, the intelligent monitoring method and apparatus provided in the present disclosure implement a warning of possible faults in the operation of the industrial equipment. Therefore a manual monitoring of the operation of the industrial equipment is not required and a complete automated operation of the industrial equipment is implemented.

BRIEF DESCRIPTION OF THE DRAWINGS

Other features, objects, and advantages of the present disclosure will become more apparent by reading the detailed description of the non-limiting embodiments with reference to the following drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
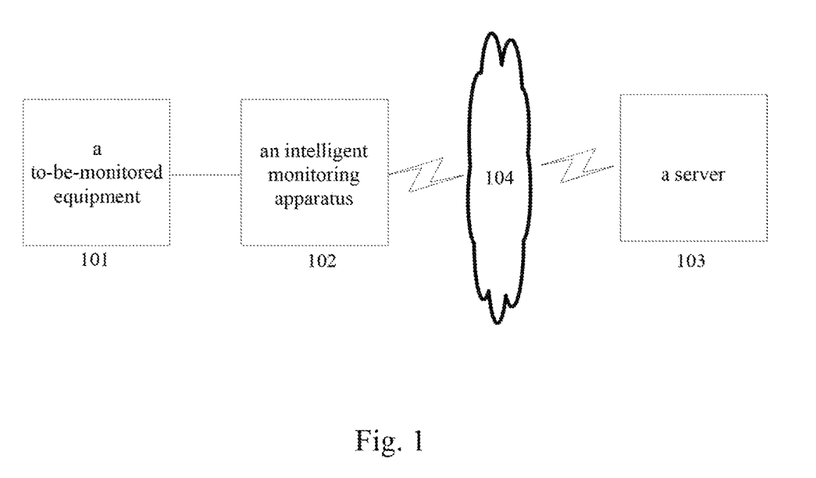
FIG. 1 shows an exemplary system architecture applicable in the intelligent monitoring method of the present disclosure.

FIG. 1 shows an exemplary system architecture employable in the intelligent monitoring method of the present disclosure.

As shown in FIG. 1, the system architecture comprises a to-be-monitored equipment 101, an intelligent monitoring apparatus 102, and a server 103. The server 103 may be deployed in the cloud. The network 104 is used to provide a medium of communication links between the intelligent monitoring apparatus 102 and the server 103. The network 104 may use a wireless communication link. The intelligent monitoring apparatus 102 may be configured with a sensor which may collect related parameters during the operation of the to-be-monitored equipment. For example, the to-be-monitored equipment is a water pump, the sensor may detect signals such as a flow temperature, a flow pressure, a bearing temperature, and an operating frequency of the water pump. The intelligent monitoring apparatus configured in each water pump may analyze parameter values of the parameters associated with the fault warning of the water pump, to obtain a time dependent characteristic of the parameter values of the warning associated parameters of the water pump. The intelligent monitoring apparatus may also send the parameter values of the parameters associated with the fault warning of the water pump to the server deployed in the cloud for analysis, the server in the cloud may obtain the time dependent characteristics of the parameter values of the parameters associated with the fault warning of different water pumps.

Figure 2:
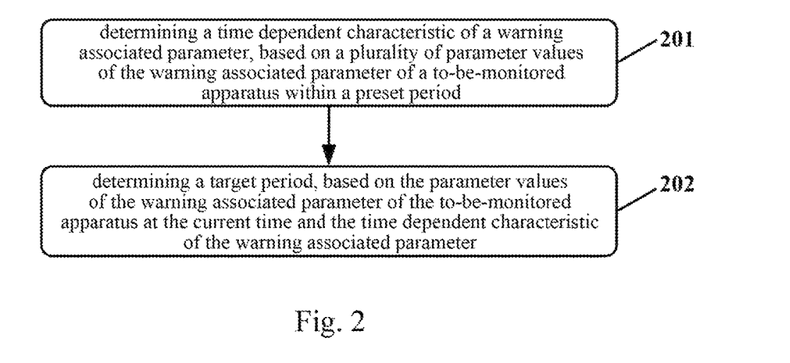
FIG. 2 shows a flow chart of one embodiment according to the intelligent monitoring method of the present disclosure.

Referring to FIG. 2, which shows a flow chart of one embodiment according to the intelligent monitoring method of the present disclosure. The method may be executed by an intelligent monitoring apparatus.

At step 201, determining a time dependent characteristic of a warning associated parameter, based on a plurality of parameter values of the warning associated parameter within a preset period.

In the present embodiment, the parameter values of the warning associated parameter of a to-be-monitored equipment may be acquired in advance, then the time dependent characteristic of the parameter values of the warning associated parameter is analyzed, to generate characteristic information indicating the time dependent characteristic of the parameter values of the warning associated parameter. For example, the to-be-monitored equipment is a water pump, the warning associated parameter may include, but not limited to: a power deviation rate, a lift deviation rate or a flow deviation rate of the water pump. The parameter values of the power deviation rate, the lift deviation rate or the flow deviation rate in multiple different time periods may be analyzed to obtain the time dependent characteristics of the power deviation rate, the lift deviation rate or the flow deviation. The time dependent characteristics of the power deviation rate, the lift deviation rate or the flow deviation can be the characteristics in the waveform composing of the parameter values of the power deviation rate, the lift deviation rate or the flow deviation.

In some optional implementations of the present embodiment, when the to-be-monitored equipment is a water pump, the warning associated parameter may be a power deviation rate of the water pump. By determining the time dependent characteristic of the power deviation rate of the water pump, an early warning of a wear degree of the water pump may be implemented. The time dependent characteristic of the power deviation rate may be the waveform characteristic of the power deviation rate such as a dither range of the waveform of the power deviation rate. The time dependent characteristic of the power deviation rate of the water pump may be determined in following manner: in a first preset period, for example, ten days executing, after every second preset period, for example, 90 seconds, following operations to determine a first characteristic of the power deviation rate: acquiring a rotation speed and a power of the water pump; calculating the power deviation rate based on the rotation speed and the power of the water pump and a rated rotation speed and a rated power, or based on the rotation speed and the power of the water pump and a calibrated speed and a calibrated power. Then, the waveform characteristic of the power deviation rate, for example, a dither range of the power deviation rate, which is determined in the current execution of the operations to determine the first characteristic of the power deviation rate, may be determined. After the operations to determine the characteristic are executed multiple times, the waveform characteristics of the power deviation rate determined each time may be aggregated to obtain the waveform characteristic of the power deviation rate of the water pump.

When executing the operations to determine the first characteristic of the power deviation rate multiple times in the first preset period, for example, ten days: during the first three days, the waveform characteristic of the power deviation rate may be determined, without a warning of the wear degree of the pump performed, that is, without determining the target period. During the following seven days, the determination of the waveform characteristic of power deviation rate continues, at the same time, the waveform characteristic of the deviation rate determined during the previous three days may be adjusted. At the same time, the warning of the wear degree of the water pump is issued. After ten days, the waveform characteristic of the power deviation rate after being adjusted may be used as a final waveform characteristic of the power deviation rate of the water pump, to perform the warning of the wear degree of the water pump.

In some optional implementations of the present embodiment, when the to-be-monitored equipment is a water pump, the warning associated parameter is the power deviation rate of the water pump, the time dependent characteristic of the power deviation rate of the water pump may be determined in following manner: when the water pump is a new pump, based on a flow-lift curve at a rated operating condition, the lift and the variable parameters of the flow may be fitted, to obtain a flow-lift curve at any rotation speed. When the water pump is not a new pump, a plurality of operating points at any rotation speed may be determined, the data of the plurality of operating points at any rotation speed may be fitted, and to obtain the flow-lift curve at any rotation speed. After the flow-lift curve at any rotation speed is obtained, in a first preset period, for example, ten days, after every second preset period, for example, 90 seconds, following operations are executed to determine a second characteristic of the power deviation rate: acquiring the rotation speed and the lift or the flow of the water pump, extracting the flow or the lift based on the flow-lift curve corresponding to the rotation speed. The efficiency of the water pump may be then calculated, and based on the efficiency of the water pump, the power deviation rate of the water pump is calculated, and the waveform characteristics of the power deviation rate is determined. After executing the operations to determine the second characteristic of the power deviation rate multiple times, the waveform characteristic of the power deviation rate of the water pump, which is determined during each of the executions of the operations to determine the second characteristic of the power deviation rate, namely, the dither range of the waveform of the power deviation rate, may be aggregated to obtain the waveform characteristic of the power deviation rate of the water pump.

When executing the operations to determine the second characteristic of the power deviation rate multiple times in the first preset period, for example, ten days: during the first three days, the waveform characteristic of the power deviation rate may be determined, without a warning of the wear degree of the pump performed, that is, without the target period determined. During the following seven days, the determination of the waveform characteristic of power deviation rate continues. At the same time, the waveform characteristic of the deviation rate determined in the previous three days may be adjusted. The warning of the wear degree of the water pump is issued concurrently. After ten days, the waveform characteristic of the power deviation rate after adjustment may be used as a final waveform characteristic of the power deviation rate of the water pump, to warn the wear degree of the water pump.

In some optional implementations of the present embodiment, when the to-be-monitored equipment is a water pump, the warning associated parameter is the power deviation rate of the water pump, the time dependent characteristic of the power deviation rate of the water pump may be determined in following manner: the power deviation rate may be calculated through a flow, a power and a rotation speed. In a first preset period, for example, ten days, executing, after every second preset period, for example, 90 seconds, following operations to determine a third characteristic of the power deviation rate: firstly, the rotation speed, the flow and the power of the water pump may be read. If it is a new operating point, the data of the new operating point is used in the fitting of a power-flow-rotation speed model, i.e., the P-Q-N model. The power-flow-rotation speed model at a rotation speed may be used for describing the corresponding relation between the power and the flow at this speed. If it is not a new operating point, the power deviation rate may be calculated based on the rotation speed, the flow and the power. After the operations to determine the third characteristic of the power deviation rate are executed multiple times, the waveform characteristics of the power deviation rate of the water pump, for example, the dither range of the waveform of the power deviation rate, which are determined during each of the executions of the operations to determine the third characteristic of the power deviation rate, may be aggregated. For example, the waveform characteristic of the power deviation rate of the water pump, which is determined during each of the executions of the operations to determine the third characteristic of the power deviation rate within the ten days, may be aggregated, to obtain the waveform characteristic of the power deviation rate of the water pump.

When executing the operations to determine the third characteristic of the power deviation rate multiple times in the first preset period, for example, ten days: during the first three days, the waveform characteristic of the power deviation rate may be determined, without a warning of the wear degree of the pump performed, that is, without the target period determined. During the following seven days, the determination of the waveform characteristic of power deviation rate continues, at the same time, the waveform characteristic of the deviation rate determined in the previous three days may be adjusted. The warning of the wear degree of the water pump is issued concurrently. After ten days, the waveform characteristic of the power deviation rate after adjustment may be used as a final waveform characteristic of the power deviation rate of the water pump, to warn the wear degree of the water pump.

Figure 6:
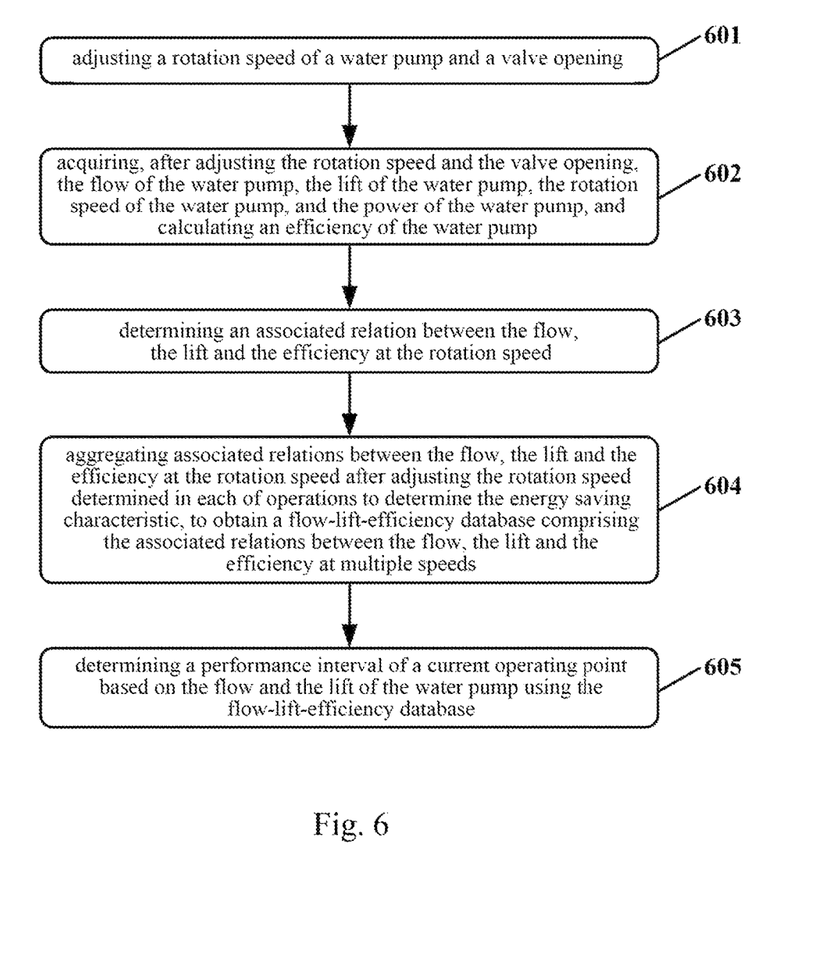
FIG. 6 shows a flow chart of one embodiment according to the intelligent monitoring method of the present disclosure.

In some optional implementations of the present embodiment, a flow-lift-efficiency database i.e., a database, may be constructed. The database may also be referred to as a water pump digital model. Through the constructed database, an actual efficiency of the water pump is monitored in real-time, and an energy saving reminder is provided. The database can be constructed in following ways to monitor the actual efficiency of the pump in real time and to provide the energy saving reminder: the following operations may be executed multiple times to determine an energy saving characteristic: adjusting 601 the rotation speed and the valve opening; reading the flow, the lift, the rotation speed and the power after adjusting the rotation speed and the valve opening. At each rotation speed, at least a preset number, for example, 13 operating points may be acquired 602, and the operating point of highest efficiency at this rotation speed is found. The numerical values of each of the operating points can be read a preset number of times, for example ten times, after every preset period, for example 20 seconds, and the average value is taken as the numerical value of the operating point. Further, the water pump efficiency may be calculated 603. After the operations to determine the energy saving characteristic are executed multiple times, the flow-lift-efficiency database can be established 604. The flow-lift-efficiency database may store the corresponding relation of the flow-lift-efficiency at any rotation speed.

Figure 7:
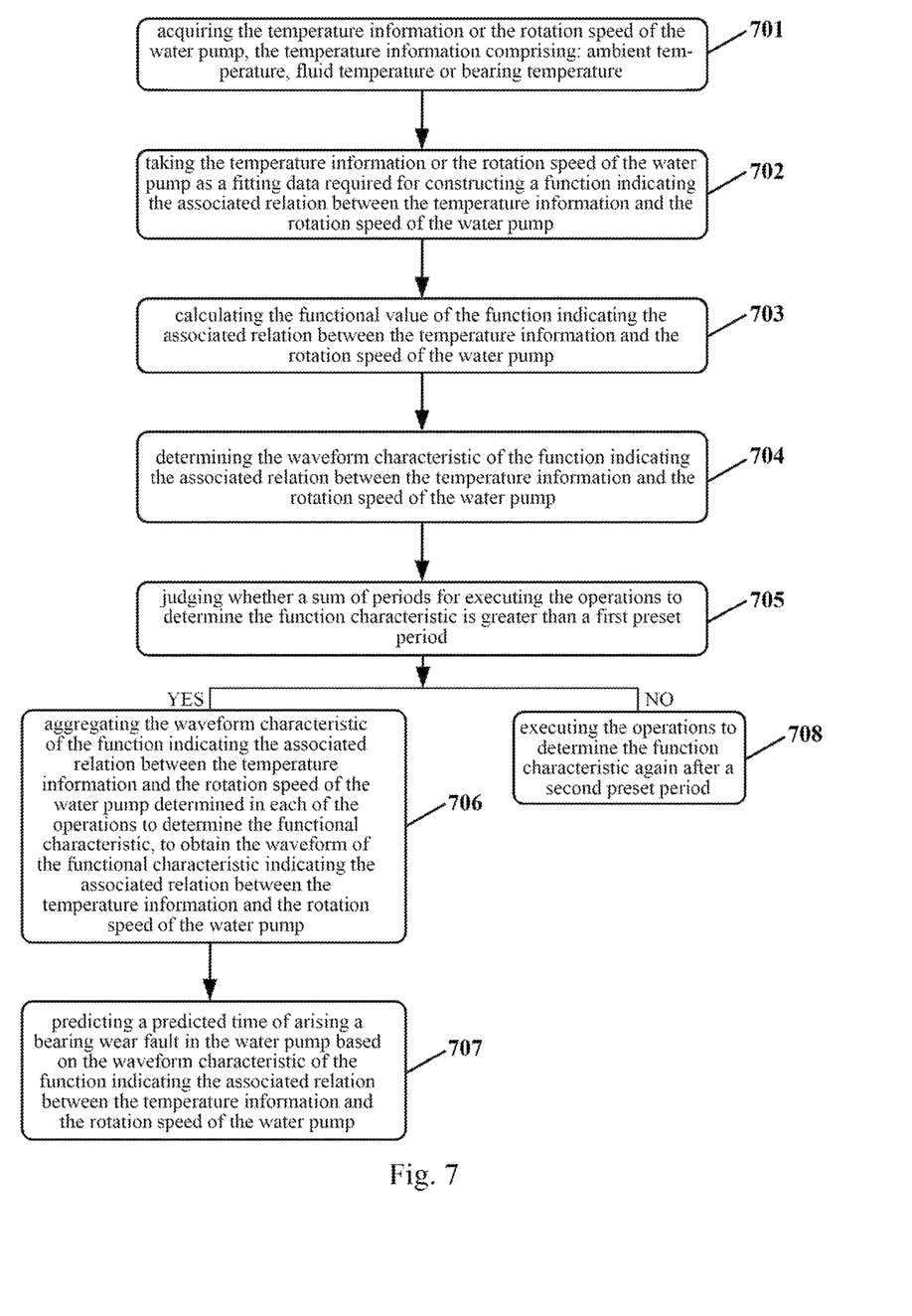
FIG. 7 shows a flow chart of one embodiment according to the intelligent monitoring method of the present disclosure.

In some optional implementations of the present embodiment, when the to-be-monitored equipment is a water pump, by determining 702 a characteristic of the function F(T,N) indicating associated relations between temperature information and the rotation speed, an early warning of a wear of a water pump bearing may be implemented. The temperature information includes 701: an ambient temperature, a fluid temperature, or a bearing temperature.

In a first preset period, for example ten days, executing, after every second preset period, for example 90 seconds, following operations to determine a function characteristic: the temperature information or the rotation speed may be firstly acquired, then the function F(T,N) is obtained through fitting. After the function F(T,N) is obtained, the functional value of the function F(T,N) may be calculated 703 and the waveform characteristic of the obtained function F(T,N) may be determined 704. After being determined multiple times, the waveform characteristics, for example a dither range, of the function F(T,N), which is obtained in each of the determinations, may be aggregated 705 to obtain the waveform characteristic of the function F(T,N).

When executing the operations to determine the function characteristic multiple times in the first preset period, for example, ten days: during the first 3 days, the waveform characteristic of the function F(T,N) may be determined, without the warning being activated, that is, without the target period determined. During the following seven days, determining and adjusting the waveform characteristics of the function F(T,N) are continued. At the same time, the warning is activated. After 10 days, the time when the amplitude of the F(T,N) function exceeds the threshold may be predicted by using the determined waveform characteristics of the function F(T,N), to implement warning of the bearing wear fault.

Figure 5:
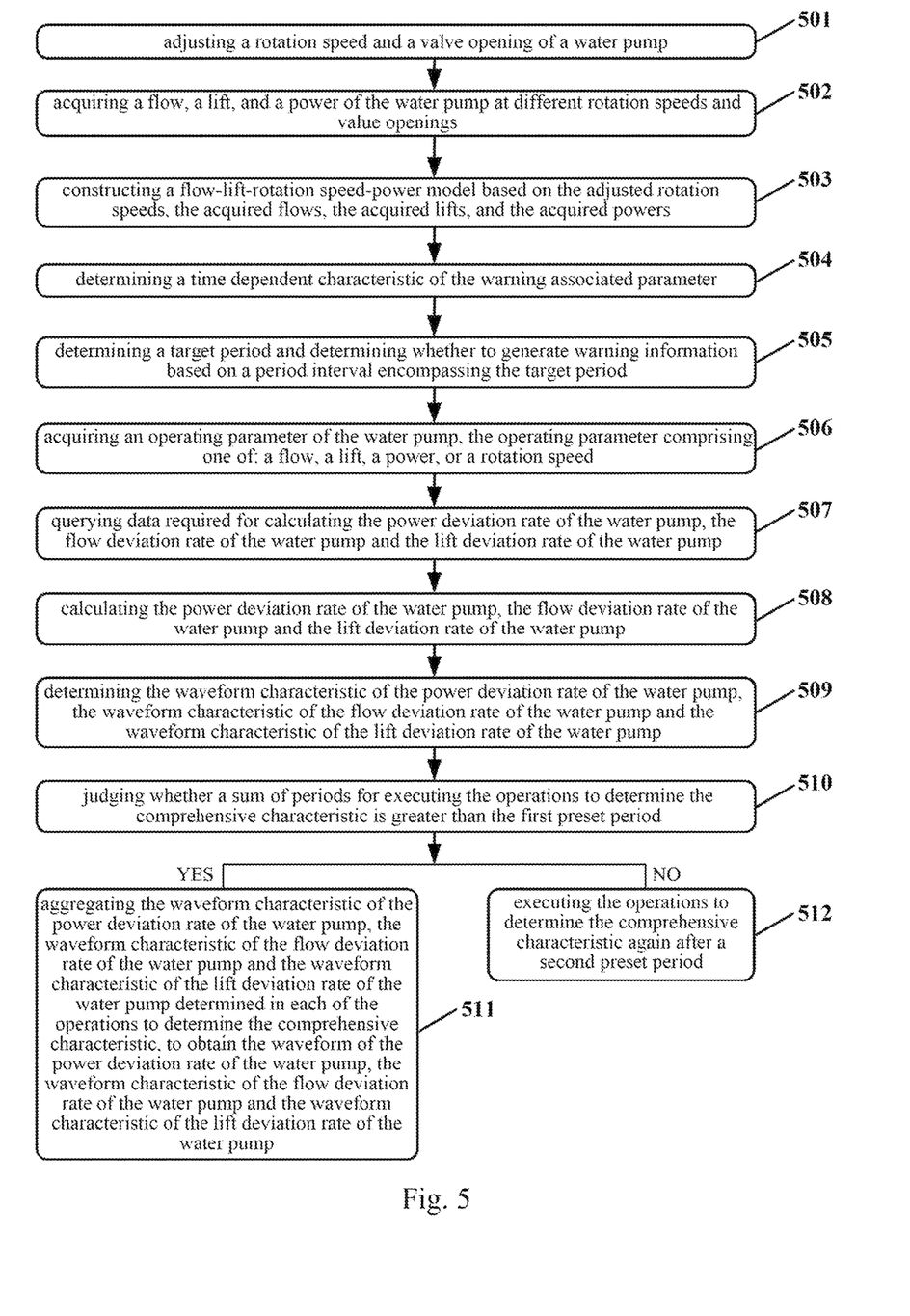
FIG. 5 shows a flow chart of one embodiment according to the intelligent monitoring method of the present disclosure.

In some optional implementations of the present embodiment, when the to-be-monitored equipment is a water pump, a P-Q-H-N model indicating the associated relation between the obtained flow, the lift, the rotation speed and the power may be constructed, to perform a comprehensive fault warning of faults such as impeller corrosion or wear fault, pump body impeller blockage fault, wear fault, shaft seal leakage fault.

Figure 8:
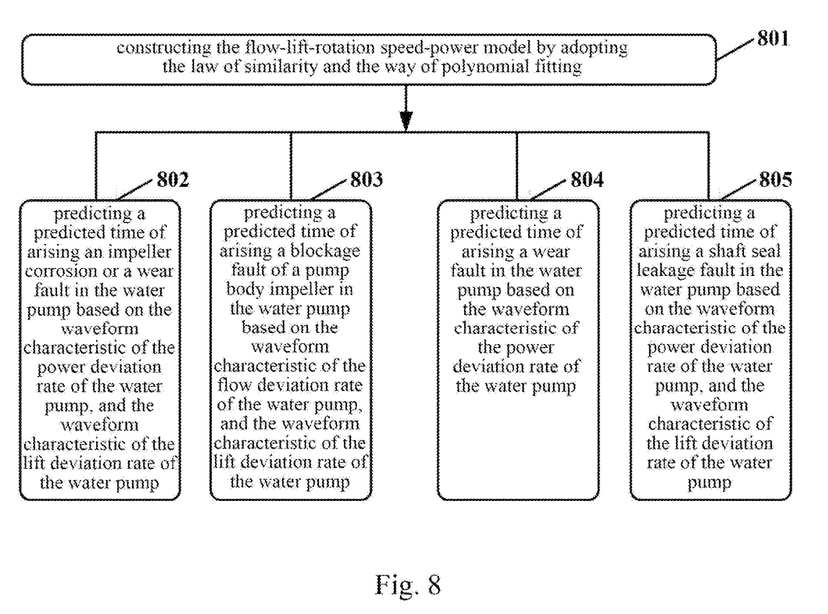
FIG. 8 shows a flow chart of one embodiment according to the intelligent monitoring method of the present disclosure.

For a new pump, by adjusting 501 the rotation speed and the valve opening, the data for constructing the flow-lift-rotation speed-power model, i.e., the P-Q-H-N model, indicating the obtained associated relation between the flow, the lift, the rotation speed and the power may be obtained 502, to construct 503 the P-Q-H-N model indicating the obtained associated relation between the flow, the lift, the rotation speed and the power. At step 504, a time dependent characteristic of a warning associated parameter is determined based on a plurality of parameter values of the warning associated parameter within a preset period. At step 505, a target period is determined based on the parameter values of the warning associated parameter of the to-be-monitored apparatus at a current time and the time dependent characteristic of the parameter values of the warning associated parameter. When the data is insufficient, the P-Q-H-N model may be constructed 801 by adopting the law of similarity and the way of polynomial fitting. For a used pump, within the preset period, for example, ten days, the data for constructing the P-Q-H-N model may be accumulated to construct the P-Q-H-N model. When the data is insufficient, the P-Q-H-N model may be constructed by adopting the law of similarity and the way of polynomial fitting.

After the P-Q-H-N model is constructed, within the first preset period, for example, ten days, the following operations to determine the comprehensive characteristic may be executed after every second preset period, for example, 90 seconds: acquiring 506 any one of the flow, the lift, the power and the rotation speed of the water pump, querying 507 the data required for calculating the power deviation rate i.e., the P_rate, the flow deviation rate i.e., the Q_rate and the lift deviation rate i.e., the H_rate from the P-Q-H-N model, to calculate 508 the power deviation rate, the flow deviation rate and the lift deviation rate.

The characteristics of the power deviation rate, the flow deviation rate and the lift deviation rate obtained during each execution of the operations to determine 509 the comprehensive characteristic may be aggregated to obtain the waveform characteristics of the power deviation rate, the flow deviation rate and the lift deviation rate.

When executing the operations to determine the comprehensive characteristic multiple times within the first preset period 510, for example, ten days: during the first three days, the waveform characteristic of the P_rate, the Q_rate and the H_rate may be determined 512, without a warning of the comprehensive fault being performed. During the following seven days, determining 511 and adjusting the waveform characteristics of the P_rate, the Q_rate and the H_rate are continued, at the same time, with the comprehensive warning of the fault activated. After 10 days, the warning of the comprehensive fault is directly performed according to the waveform characteristics of the power deviation rate, the flow deviation rate and the lift deviation rate.

At step 202, determining a target period, based on the parameter values of the warning associated parameter of the to-be-monitored apparatus at a current time and the time dependent characteristic of the parameter values of the warning associated parameter.

In the present embodiment, after the time dependent characteristic of the parameter values of the warning associated parameter is determined, the target period may be determined based on the values of the warning associated parameter of the to-be-monitored apparatus at the current time and the characteristic information.

In some optional implementations of the present embodiment, when the to-be-monitored equipment is a water pump, the warning associated parameter can be a power deviation rate of the water pump, and the time dependent characteristic of the parameter values of the warning associated parameter is the waveform characteristic of the power deviation rate. Based on the waveform characteristic of the power deviation rate of the water pump, the rotation speed and the power of the water pump at current time may be acquired, the power deviation rate of the water pump at current time may be calculated, and the target period may be determined, that is, the period between the current time and the power deviation rate of the water pump being greater than the threshold of the power deviation rate of the water pump is determined. Based on a period interval encompassing the period experienced by the threshold of the power deviation of the water pump, whether to generate the warning information may be determined. For example, when the target period is more than 72 hours, the warning information may not be generated. When the target period is between 0 and 12 hours, the warning information indicating performing a primary maintenance of highest level on the water pump may be generated.

In some optional implementation of the present embodiment, after the flow-lift-efficiency database is established, the rotation speed and the flow or the lift of the water pump at the current time can be read, or the flow and the lift can further be read. By querying the flow-lift-efficiency database, a performance interval of the current operating point is calibrated 605. The performance intervals may include but not limited to: a best performance interval, a general performance interval, and a worst performance interval.

In some optional implementations of the present embodiment, when the to-be-monitored equipment is a water pump, the warning associated parameter may be a functional value of the function indicating an associated relation between the temperature information and the rotation speed of the water pump, the time dependent characteristic of the parameter values of the warning associated parameter is the waveform characteristic of the function indicating the associated relation between the temperature information and the rotation speed of the water pump 706. By acquiring 701 the temperature information and the rotation speed of the water pump at the current time, calculating 703 the functional value of the function F(T,N), determining the target period i.e., the time when the amplitude of the function F(T,N) exceeds the threshold by utilizing the waveform characteristic of the function F(T,N), the warning of the bearing wear fault may be implemented 707. At step 708, if a sum of periods for executing the operations to determine the comprehensive characteristic is not greater than the first preset period, the operations are executed to determine the function characteristic again after a second preset period.

In some optional implementations of the present embodiment, the power deviation rate, the flow deviation rate and the lift deviation rate at the current time may be acquired based on the waveform characteristics of the power deviation rate, the flow deviation rate and the lift deviation rate of the water pump, and the target period may be calculated. The target period may be a period when the increase of the P_rate exceeds a threshold, the decrease of the H_rate crosses a threshold. It may be predicted 802 that after this target period elapsed, the impeller corrosion or the wear fault arise in the water pump. The target period may be a period when the increase of the H_rate exceeds a threshold, the decrease of the Q_rate crosses a threshold. It may be predicted 803 that after this target period elapsed, the blockage fault of the pump body impeller arises in the water pump. The target period may be a period when the increase of the P_rate exceeds a threshold. It may be predicted 804 that after this target period elapsed, the wear fault arises in the water pump. The target period may be a period when the decrease of the H_rate crosses a threshold, the decrease of the Q_rate crosses a threshold. It may be predicted 805 that after this target period elapsed, the shaft seal leakage fault arises in the water pump.

Figure 3:
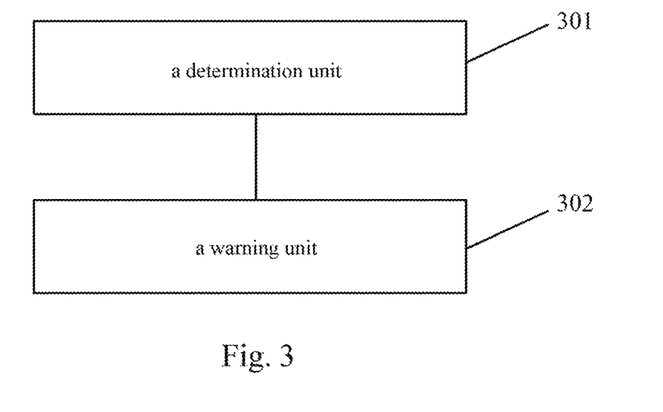
FIG. 3 shows a structural schematic diagram of one embodiment according to the intelligent monitoring apparatus of the present disclosure.

Referring to FIG. 3, which shows a structural schematic diagram of one embodiment according to the intelligent monitoring apparatus of the present disclosure.

As shown in FIG. 3, an intelligent monitoring apparatus comprises: a determination unit 301, and a warning unit 302. Here, the determination unit 301 is configured to determine a time dependent characteristic of parameter values of a warning associated parameter, based on a plurality of parameter values of the warning associated parameter of an to-be-monitored apparatus within the preset period. The warning unit 302 is configured to determine a target period, based on the parameter values of the warning associated parameter of the to-be-monitored apparatus at the current time and the time dependent characteristic of the parameter values of the warning associated parameter, and determine whether to generate a warning information based on a period interval encompassing the target period, the target period is a period between the current time and the parameter values of the warning associated parameter being greater than the threshold corresponding to the warning associated parameter.

The intelligent monitoring apparatus may perform warning of possible faults in the operation of the to-be-monitored equipment. For example, the to-be-monitored equipment is a water pump, and the intelligent monitoring apparatus may perform warning of whether the water pump requires maintenance, and the intelligent monitoring apparatus may perform the comprehensive warning of the energy saving reminder, the impeller corrosion or the wear fault, the pump body impeller blockage fault, the wear fault, the shaft seal leakage fault. Therefore a manual monitoring of the operation of the industrial equipment is not required and a complete automated operation of the industrial equipment is implemented.

Figure 4:
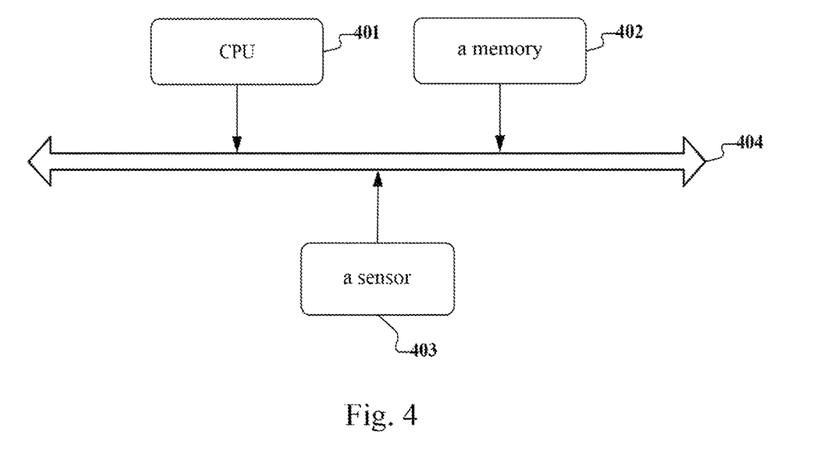
FIG. 4 shows a schematic diagram of a hardware structure of the intelligent monitoring apparatus according to the present disclosure.

Referring to FIG. 4, which shows a schematic diagram of one hardware structure of the intelligent monitoring apparatus according to the present disclosure.

As shown in FIG. 4, the intelligent monitoring apparatus comprises: a CPU 401, a memory 402, and a sensor 403, the CPU 401, the memory 402 and the sensor 403 are connected to each other through a bus 404. The intelligent monitoring method according to the present disclosure may be implemented as computer programs, the computer programs comprise instructions of the operations described in the above steps 201-202. The computer programs may be stored in the memory 402. The CPU 401 of the intelligent monitoring apparatus monitors the to-be-monitored equipment by calling the computer programs stored in the memory 402.

The present disclosure further provides a computer readable medium, which may be included in an intelligent monitoring apparatus; or may exist individually, not fitted into the intelligent monitoring apparatus. The computer readable medium carries one or more programs, when the one or more programs are executed by the intelligent monitoring apparatus, the intelligent monitoring apparatus is caused to: determine a time dependent characteristic of parameter values of the warning associated parameter, based on a plurality of parameter values of the warning associated parameter of a to-be-monitored apparatus within a preset period; determine a target period, based on the parameter values of the warning associated parameter of the to-be-monitored apparatus at a current time and the time dependent characteristic of the parameter values of the warning associated parameter, and determine whether to generate a warning information based on a period interval encompassing the target period, the target period is a period between the current time and the parameter values of the warning associated parameter being greater than the threshold corresponding to the warning associated parameter.

It should be noted that, the above-mentioned computer readable medium may be a computer readable signal medium or a computer readable storage medium, or any combination of the above two. The computer readable storage medium, for example, may include, but not limited to: a system, an equipment or a device of electricity, magnetism, light, electromagnetic, infrared, or semiconductor, or any combination of the above all. More specific examples of the computer readable storage medium may include, but not limited to: an electrical connection with one or more wires, a portable computer disk, a hard disk, a random access memory (RAM), a read only memory (ROM), an erasable Programmable Read Only Memory (EPROM or Flash), an optical fiber, a portable Compact Disk Read Only Memory (CD-ROM), an optical storage device, a magnetic storage device, or any suitable combination of the above all. In the present disclosure, the computer readable storage medium may be any tangible medium comprising or storing a program which may be used by or in connection with an instruction execution system, equipment, or device. In the present disclosure, however, the computer readable signal medium may comprise a data signal propagating in the baseband or as part of a carrier wave, a computer readable program code is carried on the data signals. Such propagating data signals may take many forms, comprising but not limited to: electromagnetic signals, optical signals, or any suitable combination of the above two. The computer readable signal medium may also be any computer readable medium other than the computer readable storage medium, this computer readable medium may send, propagate, or transport a program which may be used by or in connection with an instruction execution system, equipment, or device. The program code comprised in the computer readable medium may be transported by any appropriate medium, comprising but not limited to: wireless, electric wire, optical cable, RF, etc., or any suitable combination of the above all.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An intelligent monitoring method, the method comprising:
   adjusting a rotation speed of a water pump and a valve opening;
   acquiring a flow, a lift, and a power of the water pump at different rotation speeds and value openings;

constructing a flow-lift-rotation speed-power model based on the adjusted rotation speeds, the acquired flows, the acquired lifts, and the acquired powers;

determining, based on a plurality of parameter values of a warning associated parameter of a to-be-monitored apparatus within a preset period, a time dependent characteristic of the warning associated parameter; and determining a target period, based on the parameter values of the warning associated parameter of the to-be-monitored apparatus at a current time and the time dependent characteristic of the warning associated parameter, and determining whether to generate warning information based on a period interval encompassing the target period, the target period being a period between the current time and the parameter values of the warning associated parameter being greater than a threshold corresponding to the warning associated parameter, wherein the warning associated parameter comprises:

a power deviation rate, a flow deviation rate, and a lift deviation rate, the time dependent characteristic of parameter values of the warning associated parameter comprises:

a waveform characteristic of the power deviation rate of the water pump, a waveform characteristic of the flow deviation rate of the water pump, and a waveform characteristic of the lift deviation rate of the water pump; and the determining, based on a plurality of parameter values of the warning associated parameter of the to-be-monitored apparatus within a preset period, a time dependent characteristic of parameter values of the warning associated parameter, comprises:

executing following operations to determine a comprehensive characteristic:

acquiring an operating parameter of the water pump, the operating parameter comprising one of: a flow, a lift, a power, or a rotation speed;

querying, based on the operating parameter, from the flow-lift-rotation-speed-power model indicating an associated relation between the flow, the lift, the rotation speed, and the power, data required for calculating the power deviation rate of the water pump, the flow deviation rate of the water pump and the lift deviation rate of the water pump;

calculating the power deviation rate of the water pump, the flow deviation rate of the water pump and the lift deviation rate of the water pump, based on the queried data;

determining the waveform characteristic of the power deviation rate of the water pump, the waveform characteristic of the flow deviation rate of the water pump and the waveform characteristic of the lift deviation rate of the water pump;

judging whether a sum of periods for executing the operations to determine the comprehensive characteristic is greater than the first preset period;

if not, executing the operations to determine the comprehensive characteristic again after a second preset period; and if yes, aggregating the waveform characteristic of the power deviation rate of the water pump, the waveform characteristic of the flow deviation rate of the water pump and the waveform characteristic of the lift deviation rate of the water pump determined in each of the operations to determine the comprehensive characteristic, to obtain the waveform of the power deviation rate of the water pump, the waveform characteristic of the flow deviation rate of the water pump and the waveform characteristic of the lift deviation rate of the water pump.

2. The method according to claim 1, wherein the method further comprises:

executing following operations multiple times to determine an energy saving characteristic:

adjusting a rotation speed of a water pump and a valve opening;

acquiring, after adjusting the rotation speed and the valve opening, the flow of the water pump, the lift of the water pump, the rotation speed of the water pump, and the power of the water pump, and calculating an efficiency of the water pump;

determining an associated relation between the flow, the lift and the efficiency at the rotation speed after adjusting the rotation speed, based on the flow of the water pump, the lift of the water pump and the efficiency of the water pump after adjusting the rotation speed and the valve opening; and aggregating associated relations between the flow, the lift and the efficiency at the rotation speed after adjusting the rotation speed determined in each of operations to determine the energy saving characteristic, to obtain a flow-lift-efficiency database comprising the associated relations between the flow, the lift and the efficiency at multiple speeds.

3. The method according to claim 2, the method further comprising:

determining a performance interval of a current operating point based on the flow and the lift of the water pump using the flow-lift-efficiency database.

4. The method according to claim 1, wherein the warning associated parameter further comprises a functional value of a function indicating an associated relation between temperature information and a rotation speed of the water pump, the time dependent characteristic of parameter values of the warning associated parameter is a waveform characteristic of the function indicating the associated relation between the temperature information and the rotation speed of the water pump; and the determining, based on a plurality of parameter values of the warning associated parameter of the to-be-monitored apparatus within a preset period, a time dependent characteristic of parameter values of the warning associated parameter, further comprises:

executing following operations to determine a function characteristic:

acquiring the temperature information or the rotation speed of the water pump, the temperature information comprising: ambient temperature, fluid temperature or bearing temperature;

taking the temperature information or the rotation speed of the water pump as a fitting data required for constructing a function indicating the associated relation between the temperature information and the rotation speed of the water pump;

calculating, based on the temperature information or the rotation speed of the water pump, the functional value of the function indicating the associated relation between the temperature information and the rotation speed of the water pump;
determining the waveform characteristic of the function indicating the associated relation between the temperature information and the rotation speed of the water pump;
judging whether a sum of periods for executing the operations to determine the function characteristic is greater than a first preset period;
if not, executing the operations to determine the function characteristic again after a second preset period;
if yes, aggregating the waveform characteristic of the function indicating the associated relation between the temperature information and the rotation speed of the water pump determined in each of the operations to determine the functional characteristic, to obtain the waveform of the functional characteristic indicating the associated relation between the temperature information and the rotation speed of the water pump.

5. The method according to claim 4, the method further comprising:
predicting a predicted time of arising a bearing wear fault in the water pump based on the waveform characteristic of the function indicating the associated relation between the temperature information and the rotation speed of the water pump.

6. The method according to claim 1, the method further comprising:
predicting a predicted time of arising an impeller corrosion or a wear fault in the water pump based on the waveform characteristic of the power deviation rate of the water pump, and the waveform characteristic of the lift deviation rate of the water pump.

7. The method according to claim 1, the method further comprising:
predicting a predicted time of arising a blockage fault of a pump body impeller in the water pump based on the waveform characteristic of the flow deviation rate of the water pump, and the waveform characteristic of the lift deviation rate of the water pump.

8. The method according to claim 1, the method further comprising:
predicting a predicted time of arising a wear fault in the water pump based on the waveform characteristic of the power deviation rate of the water pump.

9. The method according to claim 1, the method further comprising:
predicting a predicted time of arising a shaft seal leakage fault in the water pump based on the waveform characteristic of the power deviation rate of the water pump, and the waveform characteristic of the lift deviation rate of the water pump.

10. The method according to claim 1, wherein the constructing a flow-lift-rotation speed-power model based on the adjusted rotation speeds, the acquired flows, the acquired lifts, and the acquired powers comprises:
constructing the flow-lift-rotation speed-power model by adopting the law of similarity and the way of polynomial fitting.

11. An intelligent monitoring apparatus, comprising:
at least one processor; and
a memory storing instructions, the instructions when executed by the at least one processor, cause the at least one processor to perform operations, the operations comprising:
adjusting a rotation speed of a water pump and a valve opening;
acquiring a flow, a lift, and a power of the water pump at different rotation speeds and value openings; and
constructing a flow-lift-rotation speed-power model based on the adjusted rotation speeds, the acquired flows, the acquired lifts, and the acquired powers;
determining, based on a plurality of parameter values of a warning associated parameter of a to-be-monitored apparatus within a preset period, a time dependent characteristic of the warning associated parameter; and
determining a target period, based on the parameter values of the warning associated parameter of the to-be-monitored apparatus at a current time and the time dependent characteristic of the warning associated parameter, and determining whether to generate warning information based on a period interval encompassing the target period, the target period being a period between the current time and the parameter values of the warning associated parameter being greater than a threshold corresponding to the warning associated parameter, wherein the warning associated parameter comprises:
a power deviation rate, a flow deviation rate, and a lift deviation rate, the time dependent characteristic of parameter values of the warning associated parameter comprises:
a waveform characteristic of the power deviation rate of the water pump, a waveform characteristic of the flow deviation rate of the water pump, and a waveform characteristic of the lift deviation rate of the water pump; and
the determining, based on a plurality of parameter values of the warning associated parameter of the to-be-monitored apparatus within a preset period, a time dependent characteristic of parameter values of the warning associated parameter, comprises:
executing following operations to determine a comprehensive characteristic:
acquiring an operating parameter of the water pump, the operating parameter comprising one of: a flow, a lift, a power, or a rotation speed;
querying, based on the operating parameter, from the flow-lift-rotation-speed-power model indicating an associated relation between the flow, the lift, the rotation speed, and the power, data required for calculating the power deviation rate of the water pump, the flow deviation rate of the water pump and the lift deviation rate of the water pump;
calculating the power deviation rate of the water pump, the flow deviation rate of the water pump and the lift deviation rate of the water pump based on the queried data;
determining the waveform characteristic of the power deviation rate of the water pump, the waveform characteristic of the flow deviation rate of the water pump and the waveform characteristic of the lift deviation rate of the water pump;
judging whether a sum of periods for executing the operations to determine the comprehensive characteristic is greater than the first preset period;

if not, executing the operations to determine the comprehensive characteristic again after a second preset period; and if yes, aggregating the waveform characteristic of the power deviation rate of the water pump, the waveform characteristic of the flow deviation rate of the water pump and the waveform characteristic of the lift deviation rate of the water pump determined in each of the operations to determine the comprehensive characteristic, to obtain the waveform of the power deviation rate of the water pump, the waveform characteristic of the flow deviation rate of the water pump and the waveform characteristic of the lift deviation rate of the water pump.

12. A non-transitory computer storage medium, storing a computer program, the computer program when executed by one or more processors, causes the one or more processors to perform operations, the operations comprising:

adjusting a rotation speed of a water pump and a valve opening;

acquiring a flow, a lift, and a power of the water pump at different rotation speeds and value openings; and constructing a flow-lift-rotation speed-power model based on the adjusted rotation speeds, the acquired flows, the acquired lifts, and the acquired powers;

determining, based on a plurality of parameter values of a warning associated parameter of a to-be-monitored apparatus within a preset period, a time dependent characteristic of the warning associated parameter; and determining a target period, based on the parameter values of the warning associated parameter of the to-be-monitored apparatus at a current time and the time dependent characteristic of the warning associated parameter, and determining whether to generate warning information based on a period interval encompassing the target period, the target period being a period between the current time and the parameter values of the warning associated parameter being greater than a threshold corresponding to the warning associated parameter, wherein the warning associated parameter comprises:

a power deviation rate, a flow deviation rate, and a lift deviation rate, the time dependent characteristic of parameter values of the warning associated parameter comprises:

a waveform characteristic of the power deviation rate of the water pump, a waveform characteristic of the flow deviation rate of the water pump, and a waveform characteristic of the lift deviation rate of the water pump; and the determining, based on a plurality of parameter values of the warning associated parameter of the to-be-monitored apparatus within a preset period, a time dependent characteristic of parameter values of the warning associated parameter, comprises:

executing following operations to determine a comprehensive characteristic:

acquiring an operating parameter of the water pump, the operating parameter comprising one of: a flow, a lift, a power, or a rotation speed;

querying, based on the operating parameter, from the flow-lift-rotation-speed-power model indicating an associated relation between the flow, the lift, the rotation speed, and the power, data required for calculating the power deviation rate of the water pump, the flow deviation rate of the water pump and the lift deviation rate of the water pump;

calculating the power deviation rate of the water pump, the flow deviation rate of the water pump and the lift deviation rate of the water pump, based on the queried data;

determining the waveform characteristic of the power deviation rate of the water pump, the waveform characteristic of the flow deviation rate of the water pump and the waveform characteristic of the lift deviation rate of the water pump;

judging whether a sum of periods for executing the operations to determine the comprehensive characteristic is greater than the first preset period;

if not, executing the operations to determine the comprehensive characteristic again after a second preset period; and if yes, aggregating the waveform characteristic of the power deviation rate of the water pump, the waveform characteristic of the flow deviation rate of the water pump and the waveform characteristic of the lift deviation rate of the water pump determined in each of the operations to determine the comprehensive characteristic, to obtain the waveform of the power deviation rate of the water pump, the waveform characteristic of the flow deviation rate of the water pump and the waveform characteristic of the lift deviation rate of the water pump.

* * * * *